3,597,438
REDUCTIVE AMINATION OF ALDEHYDES WITH RHODIUM CATALYSTS
Loren D. Brake, Wilmington, Del., assignor to E. I. du Pont de Nemours and Company, Wilmington, Del.
No Drawing. Filed May 6, 1968, Ser. No. 727,012
Int. Cl. C07c 85/08; C07d 31/02
U.S. Cl. 260—296R
8 Claims

ABSTRACT OF THE DISCLOSURE

Reductive amination of aldehydes in the presence of a rhodium catalyst is conducted at temperatures of from 0° to 125° C. Rhodium catalysts are particularly directive toward secondary amines.

BACKGROUND OF THE INVENTION

This invention relates to the preparation of amines by reductive amination of aldehydes.

Reductive amination of aldehydes is accomplished by reacting hydrogen and an aliphatic aldehyde with ammonia or a primary or secondary amine in the presence of a hydrogenation catalyst. The principal difficulties encountered in the practice of this basic procedure are (1) formation of tars and aldol condensation products, (2) the high temperatures ordinarily required and (3) alkylation of the desired product. As described in the Olin et al. U.S. Pat. 2,373,705, it has been found that the formation of tars and aldol condensation products can be reduced by progressively introducing the aldehyde into a body of the ammonia or amine at a rate approximating that at which the aldehyde is consumed. This technique minimizes the formation of local concentrations of the aldehyde which lead to excessive aldol condensation at the high reaction temperatures ordinarily required to attain a suitable reaction rate. Although the Olin et al. technique represents a definite improvement in the basic reductive amination process, the extent of aldol condensation is often still unacceptable; the economics of the process usually require that the aldehyde be introduced into the reaction vessel at a rate greater than that at which aldol condensation is minimized. The obvious solution to this problem would of course be to reduce the reaction temperature to a value at which aldol condensation proceeds less rapidly, thereby permitting a suitable aldehyde addition rate while obtaining the desired product in high yields. This has not been possible, however, because of the high temperatures required to attain economical reaction rates with many hydrogenation catalysts heretofore demonstrated in the reductive amination of aldehydes. I have found that if a rhodium catalyst is employed, reductive amination of aldehydes can be carried out at temperatures of from 0° to 125° C. At these temperatures, aldol condensation proceeds very slowly, if at all. I have also found that rhodium catalysts are particularly directive for the synthesis of secondary amines as opposed to primary and tertiary amines.

SUMMARY OF THE INVENTION

In summary, this invention is directed to the following: In a process for preparing amines comprising reacting hydrogen and an aliphatic aldehyde with ammonia, a primary amine or a secondary amine under hydrogen pressure and in the presence of a hydrogenation catalyst, the improvement wherein said catalyst is a rhodium catalyst and said process is conducted at a temperature of from about 0° to about 125° C.

This invention is also directed to the following: In a process for preparing amines comprising progressively introducing an aliphatic aldehyde into a body of ammonia, primary amine or secondary amine in the presence of a hydrogenation catalyst and under hydrogen pressure at an average rate approximating the rate at which said aldehyde is consumed, the improvement wherein said catalyst is a rhodium catalyst and said process is conducted at a temperature of from about 0° to about 125° C.

DETAILED DESCRIPTION OF THE INVENTION

In the practice of the process of this invention, the rhodium catalyst will ordinarily be present in an amount equal to at least 0.001% by weight, calculated as metallic rhodium, of the amine or ammonia. The rhodium catalyst can be used in an amount up to 10% or more, but little advantage is gained by the use of more than 10%. Preferably, from about 0.01 to 1% by weight of catalyst, calculated as metallic rhodium, and based on the starting weight of the amine or ammonia will be utilized. The rhodium can be used as a metal or it can be supported on an inert carrier such as those described in Chapter 7 of Catalysis, Berkman, Morrell and Egloff, Reinhold Publishing Corporation (N.Y. 1940) and Chapter 6 of Catalysis Vol. I, Emmett, Reinhold Publishing Corporation (N.Y. 1940). Representative of such carriers are carbon, calcium carbonate, rare earth oxides, rare earth carbonates, mixed rare earth oxides-carbonates, alumina, barium sulfate, kieselguhr, pumice, diaspore, bauxite, zirconia, titania, diatomaceous earth, calcium sulfate, calcium oxide, barium oxide, silica, silica-alumina and strontium oxide. Preferred supports for rhodium are alumina, kieselguhr, barium sulfate, carbon, calcium carbonate, rare earth oxides, rare earth carbonates and mixed rare earth oxides-carbonates. The most preferred support material is alumina.

Illustrative of the amines which can be alkylated by the process of this invention are aliphatic and cycloaliphatic mono- and diamines and substituted and unsubstituted aromatic amines, e.g., methylamine, dimethylamine, ethylamine, propylamine, cyclohexylamine, dicyclohexylamine, hexamethylenediamine, 1,3-diaminocyclohexane, 1,4-diaminocyclohexane, 4,4' - methylenedi(cyclohexylamine), 1-aminodecalin, 4-methylcyclohexylamine, 3-methoxycyclohexylamine, aniline, o-toluidine, m-anisidine, p-phenylenediamine, 1,5 - diaminonaphthalene, α-naphthylamine, N-methylaniline and N-ethylaniline.

Illustrative of the aldehydes which can be used in the process of this invention are formaldehyde, acetaldehyde, propionaldehyde, n-butyraldehyde, sec-butyraldehyde, 2-ethyl butyraldehyde, hexanal, decanal, 2-methyl butyraldehyde, phenyl acetaldehyde and 2-phenyl propionaldehyde. Because of the low reaction temperatures which are employed, the advantages of the process of this invention are particularly important in the reductive amination of aldehydes which readily undergo aldol condensation, i.e., acetaldehyde, propionaldehyde, n-butyraldehyde and isobutyraldehyde.

Reductive amination of aldehydes according to the process of this invention is usually conducted in liquid phase and usually in a mutual solvent for the ammonia or amine and the aldehyde, e.g., saturated aliphatic and alicyclic hydrocarbon solvents including alicyclic and aliphatic hydrocarbon ethers and alcohols. Representative of specific solvents which can be used are methyl alcohol, ethyl alcohol, isopropyl alcohol, n-butyl alcohol, cyclohexane, n-hexane, n-propyl ether, n-butyl ether, ethyl ether, isopropyl ether, isobutyl ether, the amyl ethers, tetrahydrofuran, dioxane, dioxylane, di-isopropyl ether and dicyclohexyl ether. Water can also be used as a solvent as can mixtures of two or more of the above-mentioned solvents. Solvents are sometimes used in concentrations as low as 0.2 part by weight of solvent per part of starting compounds; but amounts of solvents from about 25% to about 200% of the weight of starting material will ordinarily be used. Greater amounts of solvent can of course be used, even as high as 1000 to 2000% based on the starting materials, but such amounts merely dilute the components in the reaction mass with no particular advantages being obtained.

As will be appreciated by one skilled in the art, the hydrogen partial pressure utilized may be varied considerably. A hydrogen partial pressure of at least 100 p.s.i. is ordinarily necessary to achieve good results and hydrogen partial pressures of at least 500 p.s.i. are preferred; because of operation costs and equipment requirements, 15,000 p.s.i. is a practical upper limit. The total pressure during hydrogenation will ordinarily range from about 100 to about 15,000 p.s.i.

As pointed out above, one of the distinct advantages of using a rhodium catalyst is that reductive amination can be carried out at from about 0° to about 125° C., preferably from about 10° to 85° C.

Although aldol condensation occurs to a much lesser extent at these temperatures than at the higher temperatures required with most catalysts which have heretofore been utilized in reductive amination, it will be appreciated by persons skilled in the art that aldol condensation can be further reduced by utilizing the technique described by Olin et al. in U.S. Pat. 2,373,705 referred to above. As is well known in the art, it will be desirable in the preparation of primary or secondary amines to prevent the concentration of the desired product from building up in the reaction vessel to a value at which alkylation of the product proceeds to an unacceptable extent. In a continuous process, this is ordinarily accomplished by continuously purging a portion of the contents of the reaction vessel, separating the product amine from the unreacted starting materials and/or intermediates and recycling these latter materials to the reaction vessel.

The "directivity" which rhodium catalysts demonstrate toward secondary amines is particularly surprising and particularly advantageous. Using a rhodium catalyst, secondary amines can be allowed to accumulate in the reaction mixture to higher concentrations than possible with other hydrogenation catalysts without unacceptable amounts of tertiary amines being formed. In commercial operation the amount of unreacted ammonia and/or primary amine which must be recycled is therefore substantially reduced. Thus, the results obtained by the use of a rhodium catalyst in the formation of secondary amines are particularly outstanding as compared to the results obtained using reductive amination catalysts known in the art. This is demonstrated further in the following examples.

From the above, it will be seen that in the preferred operation of the process of this invention the aldehyde is progressively introduced into a body of ammonia, primary amine or secondary amine at a rate approximating that at which the aldehyde is consumed. A continuous purge of the reaction mixture is begun to maintain the concentration of the desired amine near, but below, the value at which alkylation of the product occurs to an unacceptable extent. The desired product is separated from the purge, e.g., by distillation, and the unreacted starting material and/or amine intermediates are returned to the reaction mixture together with a make-up stream of fresh starting materials.

The process of this invention is further illustrated by the following examples in which all parts and percentages are by weight unless otherwise specified.

EXAMPLE 1

1160 parts of butylamine and 75 parts of 5% rhodium supported on alumina are charged into a suitable pressure vessel. The contents of the vessel are heated to and maintained at a temperature of 85° C. A constant hydrogen pressure 3300 p.s.i. gauge is also maintained. To the vessel is then progressively added 1000 parts of butyraldehyde over a period of 1½ hours. Five minutes after the butyraldehyde addition is complete, the vessel is vented and the reaction mixture is freed of catalyst by filtration. Distillation of the filtrate under vacuum gives dibutylamine (B.P. 159° C.) in an amount equal to a 95% yield based on the butylamine consumed. The distillation residue represents a 1% yield loss.

EXAMPLE 2

150 parts of cyclohexylamine, 150 parts of dioxane and 20 parts of 5% rhodium supported on alumina are charged into a suitable pressure vessel. The contents of the vessel are maintained at a temperature of about 20° C. and under a constant hydrogen pressure of 3000 p.s.i. gauge while 80 parts of 37% aqueous formaldehyde are progressively added over a period of 30 minutes. Ten minutes after the formaldehyde addition is complete, the vessel is vented and the reaction mixture is freed of the catalyst by filtration. Gas chromatographic analysis of the filtrate indicated that the product contained 31.2% cyclohexylamine and 68.8% N-methylcyclohexylamine. N,N-dimethylcyclohexylamine is not detected. The distillation residue represents a 1.8% yield loss.

EXAMPLE 3

Example 2 is repeated three times at 100° C., first employing 20 parts of 5% rhodium supported on alumina, then employing 20 parts of 50% cobalt on kieselguhr as the catalyst and finally using 20 parts of 5% ruthenium on alumina as the catalyst. Gas chromatographic analyses of the three products obtained are summarized in the following table:

| Catalyst | Percent | | |
|---|---|---|---|
| | Cyclohexylamino | N-methyl-cyclohexylamine | N,N-dimethyl-cyclohexylamine |
| Rh | 35.3 | 64.7 | 0 |
| Co | 60.0 | 20.4 | 19.6 |
| Ru | 48.5 | 40.2 | 11.3 |

The above results demonstrate the selective directivity of a rhodium catalyst to secondary amines as compared with the cobalt and ruthenium under identical reaction conditions.

EXAMPLE 4

100 parts of aniline, 200 parts of methanol and 10 parts of 5% rhodium on carbon are charged into a suitable pressure vessel. While the contents of the vessel are maintained at 75° C. and under a constant hydrogen pressure of 5000 p.s.i. gauge, 115 parts of butyraldehyde in 115 parts of dioxane are progressively added over a period of 30 minutes. Fifteen minutes after the butyraldehyde-dioxane addition is complete, the reaction mixture is cooled to ambient temperatures and the reaction vessel is vented. The resulting reaction mixture is freed of catalyst by filtration. Distillation of the filtrate under vacuum gives N-butylaniline (B.P. 165° C./100 mm.) in a 93% yield. The distillation residue represents a 2.2% yield loss.

EXAMPLES 5–18

The product amines enumerated below are prepared as described in Example 4 by substituting individually for the aniline and butyraldehyde equivalent amounts of the specified amine and aldehyde.

| Ex. | Product | Amine | Aldehyde |
|---|---|---|---|
| 5 | N-ethylaniline | Aniline | Acetaldehyde. |
| 6 | N-methylbutylamine | Methylamine | Butyraldehyde. |
| 7 | N-methylethylamine | do | Acetaldehyde. |
| 8 | do | Ethylamine | Formaldehyde. |
| 9 | N-butyl-p-toluidine | p-Toluidine | Butyraldehyde. |
| 10 | N-propyl-m-anisidine | m-Anisidine | Propionaldehyde. |
| 11 | N-ethyl-1-naphthylamine | 1-naphthylamine | Acetaldehyde. |
| 12 | N-butyldecylamine | Decylamine | Butyraldehyde. |
| 13 | N-propylcyclohexyl-amine | Cyclohexylamine | Propionaldehyde. |
| 14 | N-methylcyclopentyl-amine | Cyclopentylamine | Formaldehyde. |
| 15 | N-ethylcycloheptyl-amine | Cycloheptylamine | Acetaldehyde. |
| 16 | N-butyl-2-methylcyclohexylamine | 2-methylcyclohexylamine | Butyraldehyde. |
| 17 | 2-(ethylamino)pyridine | 2-aminopyridine | Acetaldehyde. |
| 18 | 4-(butylamino)pyridine | 4-aminopyridine | Butyraldehyde. |

EXAMPLE 19

850 parts of hexamethylenediamine, 800 parts of methanol and 100 parts of 5% rhodium supported on alumina are charged into a suitable pressure vessel. The contents of the vessel are maintained at a temperature of 80° C. and under a constant hydrogen pressure of 4000 p.s.i. gauge while 425 parts of acetaldehyde in 1000 parts of methanol are added to the reaction mixture over a period of two hours. Samples of the reaction mixture are withdrawn during the course of the acetaldehyde addition and these samples are analyzed by gas chromatography to determine the product distribution. These samples are also analyzed by distillation to determine the amounts of tars and condensation products. The analytical results are as follows:

| | Product distribution by G.C. | | | | |
|---|---|---|---|---|---|
| Sample | Hexamethylenediamine, percent | N-ethylhexa-meahylene-amine, percent | N,N'-diethyl-hexamethylene-diamine, percent | Distillation tars, percent | Reaction time, min. |
| 1 | 65.9 | 31.5 | 2.6 | | 30 |
| 2 | 44.4 | 48.5 | 7.1 | 2.5 | 60 |
| 3 | 19.5 | 61.3 | 19.1 | 2.2 | 80 |
| 4 | 8.5 | 59.5 | 32.0 | 3.3 | 100 |
| 5 | 4.6 | 52.9 | 42.6 | 2.0 | 120 |

EXAMPLES 20–27

The product amines identified below are prepared as described in Example 19 by substituting individually for the hexamethylenediamine and acetaldehyde an equivalent amount of the amine and aldehyde specified below:

| Ex. | Product | Amine | Aldehyde |
|---|---|---|---|
| 20 | N,N'-dibutyl-p-phenylenediamine. | p-Phenylenediamine. | Butyraldehyde. |
| 21 | N,N'-dipropyl-1,5-naphthalenediamine. | 1,5-naphthalene-diamine. | Propionaldehyde. |
| 22 | N,N'-dibutyl-trimethylenediamine. | 1,3-trimethyl-enediamine. | Butryraldehyde. |
| 23 | N,N'-diethyl-1,3-cyclohexanediamine. | 1,3-cyclohexane-diamine. | Acetaldehyde. |
| 24 | N,N'-dibutyl-1,5-di-aminodecalin. | 1,5-diamino-decalin. | Butyraldehyde. |
| 25 | N,N'-dibutyl,2-4-toluenediamine. | 2,4-toluenediamine. | Do. |
| 26 | N,N'-dimethyl-1,4-cyclohexanediamine. | 1,4-cyclohex-anediamine. | Formaldehyde. |
| 27 | N,N'-diethyl-4,4'-methylenebiscyclohexylamine. | 4,4'-methylene-biscyclohexyl-amine. | Acetaldehyde. |

EXAMPLE 28

500 parts of cyclohexylamine, 800 parts of methanol and 75 parts of 5% rhodium supported on alumina are charged into a suitable pressure vessel. While the contents of the vessel are maintained at a temperature of 70° C. and under a constant hydrogen pressure of 3000 p.s.i. gauge, 475 parts of acetaldehyde in 1000 parts of methanol are added progressively over a period of 1½ hours. Five minutes after the acetaldehyde-methanol addition is complete the vessel is cooled and then vented. The resulting reaction mixture is freed of catalyst by filtration. Distillation of the filtrate under vacuum gives N,N-diethylcyclohexylamine (B.P. 74° C./12 mm.) in an amount equal to the 94% yield based on the cyclohexylamine consumed. The distillation residue represents a 5% yield loss.

EXAMPLES 29–36

The product amine indicated below are prepared as described in Example 28 by substituting individually for the cyclohexylamine and acetaldehyde the amine and aldehyde indicated in the following table:

| Ex. | Product | Amine | Aldehyde |
|---|---|---|---|
| 29 | N,N-dimethylaniline | Aniline | Formaldehyde. |
| 30 | N,N,N',-tetrabutyl-1,4-cyclohexanediamine. | 1,4-cyclohexane-diamine. | Butyraldehyde. |
| 31 | N,N,N',N'-tetraethyl-4,4'-methylenebis-cyclohexylamine. | 4,4'-methylene-biscyclohexyl-amine. | Acetaldehyde. |
| 32 | N-methyldiethylamine | Methylamine | Do. |
| 33 | N-ethyl-N-methyl-butylamine. | N-methylethyl-amine. | Butyraldehyde. |
| 34 | N-butyldipropylamine | Butylamine | Propionaldehyde. |
| 35 | N,N-dimethyl-p-toluidine. | p-Toluidine | Formaldehyde. |
| 36 | N,N-dipropyl-m-anisidine. | m-Anisidine | Propionaldehyde. |

EXAMPLE 37

800 parts of a mixture of hexamethylenediamine, N-ethylhexamethylenediamine, N,N'-diethylhexametyhlenediamine and 75 parts of 5% rhodium supported on alumina are charged into a steel autoclave equipped with a stirring apparatus and a product drawoff system which retains the catalyst in the reactor. The contents of the vessel are heated with stirring to 85° C. and a hydrogen pressure of 4200 p.s.i. gauge is maintained while hexamethylenediamine and acetaldehyde as 50% solutions in methanol are fed into the auotclave as separate streams in approximately 1:1.5 mole ratio at such a rate to maintain a 30 minute residence time while a product stream is withdrawn so as to maintain a fixed reactor volume. The results of gas chromatographic analyses of the starting materials and four 30-minute product cuts are as follows:

| | Percent | | | |
|---|---|---|---|---|
| Sample | Hexamethylenediamine | N-ethylhexa-methylenediamine | N,N'-diethyl-hexamethylenediamine | High boiling unknown |
| Charge | 15.6 | 45.6 | 35.3 | 3.3 |
| 1 | 23.7 | 42.8 | 30.5 | 3.0 |
| 2 | 26.1 | 37.7 | 33.5 | 2.7 |
| 3 | 13.1 | 45.3 | 38.3 | 3.1 |
| 4 | 15.2 | 45.6 | 36.0 | 3.2 |

What is claimed is:

1. In a process for preparing secondary amines by reductive amination comprising reacting hydrogen and an aliphatic aldehyde with ammonia or a primary amine under hydrogen pressure in the presence of a catalyst, the improvement wherein said catalyst is a rhodium metal catalyst and said process is conducted at a temperature of from 0° to 125° C.

2. The process of claim 1 wherein said process is conducted at a temperature of 10° to 85° C.

3. The process of claim 2 wherein said rhodium metal catalyst is present in an amount equal to from about 0.001 to about 10% by weight based on the weight of said ammonia or primary amine.

4. In a process for preparing secondary amines by reductive amination comprising progressively introducing an aliphatic aldehyde into a body of ammonia or a primary amine maintained in the presence of a catalyst and under hydrogen pressure at an average rate approximating the rate at which said aldehyde is consumed, the improvement wherein said catalyst is a rhodium metal catalyst and said process is conducted at a temperature of from 0° to 125° C.

5. The process of claim 4 wherein said process is conducted at a temperature of from 10° to 85° C.

6. The process of claim 5 wherein said rhodium metal catalyst is present in an amount equal to from about 0.001 to about 10% by weight based on the weight of said ammonia or primary amine.

7. The process of claim 6 wherein said aldehyde is acetaldehyde, propionaldehyde, n-butyraldehyde or isobutyraldehyde.

8. The process of claim 6 wherein the rhodium metal catalyst is supported in an alumina carrier.

References Cited
UNITED STATES PATENTS

| | | | |
|---|---|---|---|
| 2,618,658 | 11/1952 | Caldwell | 260—584 |
| 2,809,995 | 10/1957 | Noeske et al. | 260—585X |
| 2,894,038 | 7/1959 | Bartlett et al. | 260—563X |
| 3,194,839 | 7/1965 | Robinson et al. | 260—563X |
| 3,350,450 | 10/1967 | Dovell et al. | 260—577 |
| 3,442,951 | 5/1969 | Thirion | 260—583 |

OTHER REFERENCES

Adams et al. "Organic Reactions," vol. IV (1948), pp. 175, 178, 181, 182, 194, 195, 208, 214, 215, 216, 217, 225, 226, 227 and 248.

CHARLES B. PARKER, Primary Examiner

D. R. PHILLIPS, Assistant Examiner

U.S. Cl. X.R.

260—563R, 574, 577, 583R, 585C